Feb. 26, 1929.    G. A. KING    1,703,151

SELF LOCKING PIN FASTENER

Filed April 6, 1928

Inventor
George A. King
by
*[signature]*
Attorney

Patented Feb. 26, 1929.

1,703,151

UNITED STATES PATENT OFFICE.

GEORGE A. KING, OF WATERBURY, CONNECTICUT, ASSIGNOR TO SCOVILL MANUFACTURING COMPANY, OF WATERBURY, CONNECTICUT, A CORPORATION OF CONNECTICUT.

SELF-LOCKING PIN FASTENER.

Application filed April 6, 1928. Serial No. 267,917.

The object of this invention is to provide a pin, preferably a capped pin, for use in fastening covers to the upholstered parts of automobiles, although the invention is useful in other relations.

The invention consists of a double-pointed pin, having an overturned head adapted to be engaged by a cap, when one is used, and having the legs of the pin drawn together in a triangular or substantial V-shape, so that the said legs are in contact at the point of the V and then diverge toward their sticking points, whereby the sticking points of the pin enter an article to be fastened at some distance apart so as to gather in or bunch the article between the legs, and thereafter as the pin is forced home, this gathered-in material is contracted and finally forced through the meeting points of the V and opens up, more or less, in the space above said meeting points, whereby the pin is locked in said position and requires considerable force to withdraw it, as I will proceed now to explain more fully and finally claim.

Figure 1:
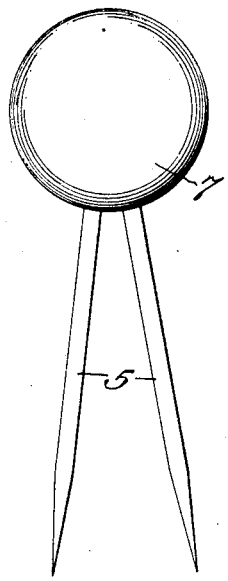
Figure 2:
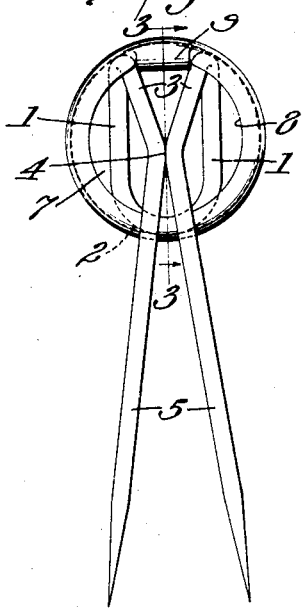
Figure 3:
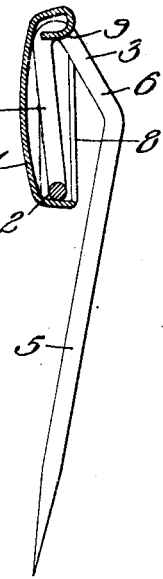
Figure 4:
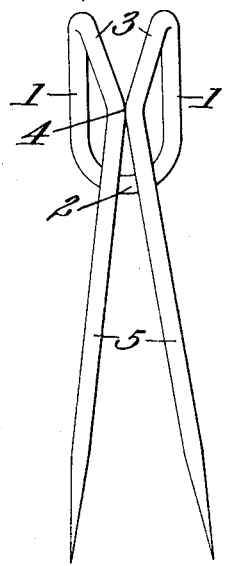
Figure 5:
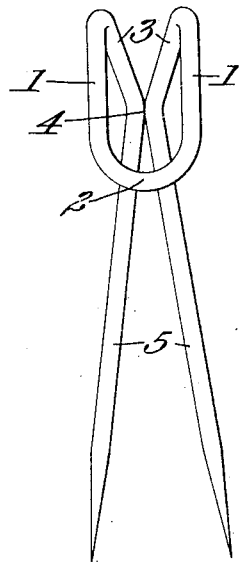

In the accompanying drawings illustrating the invention, in the several figures of which like parts are similarly designated, Figure 1 is a front elevation; Fig. 2 is a rear elevation, and Fig. 3 is a longitudinal section taken in the plane of line 3—3, Fig. 2. Fig. 4 is a rear elevation, and Fig. 5 is a front elevation of the pin separate from the cap, which latter is shown in Figs. 1, 2 and 3.

The pin comprises a head composed of the parallel side members 1, the bowed portion 2 and the converging portions 3 of the legs, these converging portions meeting at the contact points 4 and forming above these points a substantial V-shaped space. From the points 4 the legs 5 diverge so that their points will enter the material to be fastened at a distance, and as the pin is forced home its legs gather in or bunch the material between them, whereby this gathered-in material will be compressed between the converging portions of the legs and the volume reduced so as to permit the passage of the material between the points 4 and into the V-shaped space above said points, where it expands or unfolds and thus securely locks the pin against accidental escape.

Of course the resilience in the legs of the pin resists the accidental escape of the material engaged by the pin, and the V-shape or triangular formation affords considerable friction in resisting the escape of the pin from the thing fastened by it.

The triangular or V-shaped portion of the pin opposite the top of the head, is bent away from the head at a downward angle, as indicated at 6, Fig. 3, so as to increase the locking capacity of the pin.

The pin as shown, is provided with a cap 7 having a reverted flange 8, back of which the pin of the head lies; there being a lug 9 turned back between the upper ends of the sides of the head, and the lower portions of the flange overlying the bowed portion 2.

Variations in the details of construction are permissible within the principle of the invention and the scope of the claims following.

What I claim is:—

1. A self-locking pin fastener, having an overturned head from which the legs extend, the upper portions of the legs next to the head bent to form a triangular space, the bottom of which has the inbent legs in contact.

2. A self-locking pin fastener, having an over turned head from which the legs extend, the upper portions of the legs adjacent to the head bent to form a triangular space and lying in a plane at an angle to the head, the bottom of said space having the inbent legs in contact, the remainder of the legs diverging from this point of contact.

3. A self-locking pin fastener, having a head from which the legs extend outwardly at an angle, the upper portions of the legs bent to form a triangular space, the bottom of which has the inbent legs in contact.

In testimony whereof I have hereunto set my hand this 5th day of April A. D. 1928.

GEORGE A. KING.